J. NICHOLS.
BEE TRAP.
APPLICATION FILED JUNE 21, 1909.
945,407.
Patented Jan. 4, 1910.
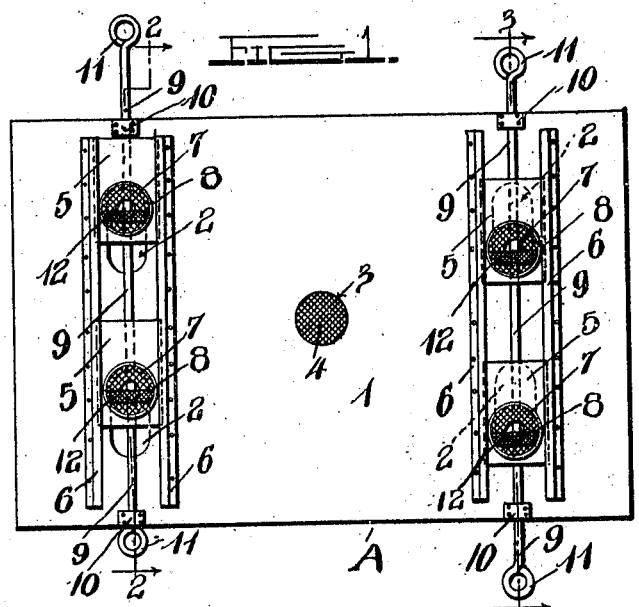
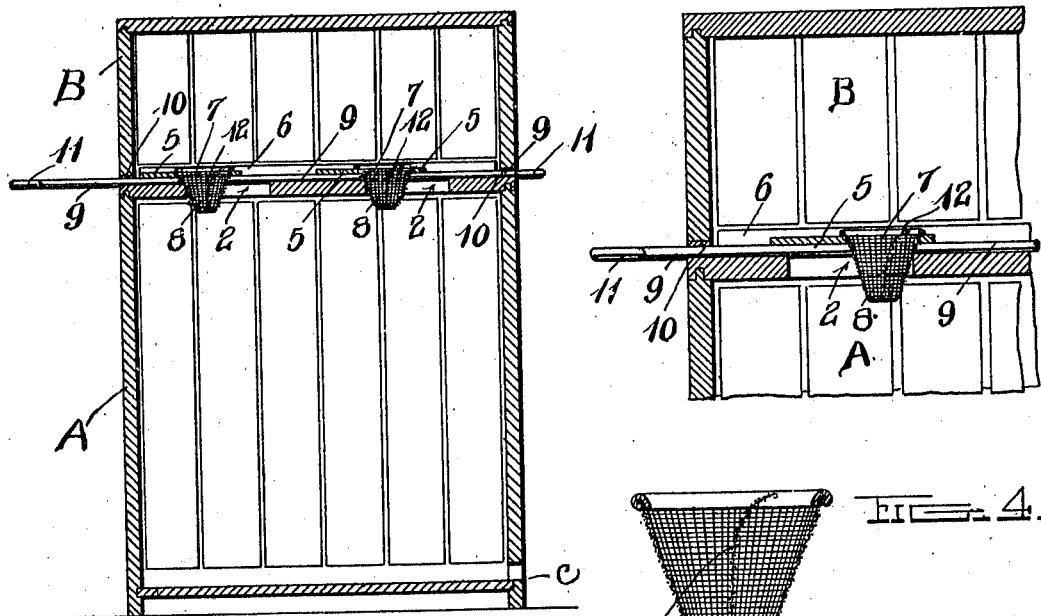
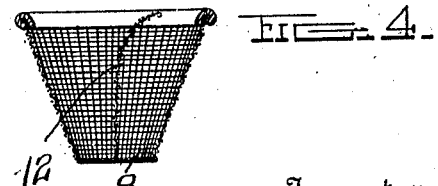
Inventor
Josiah Nichols.
Witnesses
by Attorneys

UNITED STATES PATENT OFFICE.

JOSIAH NICHOLS, OF LIMA, OHIO.

BEE-TRAP.

945,407.  Specification of Letters Patent.  Patented Jan. 4, 1910.

Application filed June 21, 1909. Serial No. 503,586.

*To all whom it may concern:*

Be it known that I, JOSIAH NICHOLS, a citizen of the United States, residing at Lima, in the county of Allen and State of Ohio, have invented certain new and useful Improvements in Bee-Traps; and I do declare the following to be a full, clear, and exact description of the invention, such as will enable others skilled in the art to which it appertains to make and use the same.

This invention relates to improvements in bee traps.

The object of the invention is to provide a device of this character adapted to be applied to a hive whereby the bees are allowed to leave the upper portion of the hive but cannot return until the trap is shifted to an open position, thus permitting the removal of the honey without disturbing the bees.

With the foregoing and other objects in view, the invention consists of certain novel features of construction, combination and arrangement of parts, as will be more fully described and particularly pointed out in the appended claims.

In the accompanying drawings, Figure 1 is a plan view of the lower portion of a hive, showing the application of two of my improved traps, one of the latter being shown in open position and the other in closed position; Fig. 2 is a vertical section of a complete hive taken on the line 2—2 of Fig. 1, showing the trap open; Fig. 3 is a similar view on the line 3—3 of Fig. 1, showing the trap closed; Fig. 4 is an enlarged sectional view of the wire cone forming part of the trap.

Referring more particularly to the drawings, 1 denotes the top of the lower section A of a hive in which are formed passages 2 by means of which the bees may pass into and out of the upper section B of the hive. The passages 2 are elongated or of oblong shape and slidably mounted over the same is my improved trap. In the top 1 is also arranged an air or ventilating passage 3 which is covered with a suitable screen 4. The lower section of the hive is provided with the usual inlet and outlet passage C for the bees.

My improved trap comprises a plate 5 which is slidably mounted over the passage 2 in suitable guides 6 which are secured to the outer side of the top 1 of the lower section of the hive, adjacent to each side of the passages 2, as shown. In the sliding plate 5, adjacent to one end, is an aperture 7 in which is arranged a substantially conical-shaped funnel 8 which is preferably formed of wire netting, and projects through the passages 2. The funnel 8 is adapted to be moved from one end to the other of the passages 2 when the plates 5 are shifted in one direction or the other in their guides, 6. To the opposite ends of the plates 5 are secured shifting rods 9 which preferably engage channels or grooves formed in the outer surface of the top 1 and are held in sliding engagement with said channels by retaining strips 10 which are secured to the outer side of the top 1 in any suitable manner. On the outer ends of the shifting rods 9 are formed eyes or loops 11 by means of which said rods may be grasped and the plates 5 shifted thereby back and forth across the passages 2. When the plates 5 have been drawn outwardly in one direction, one end of the passages 2 will be opened, thereby permitting the bees to freely pass into and out of the upper section of the hive. When the plates 5 have been shifted in the opposite direction, the passages 2 will be closed and the bees in the hive compelled to pass out of the upper section of the hive through the conical-shaped funnel 8, which, owing to its peculiar shape, will not readily permit the bees to reënter said section, so that after all of the bees have passed out or down into the lower section, the honey may be removed from the upper section, before they are permitted to again enter the latter, thus obviating the necessity of stupefying or disturbing the bees in any manner to permit the removal of the honey. In order to further retard the entrance of the bees to the upper section, I provide said funnel 8 with a baffle plate or tongue 12 which is preferably arranged therein, as shown.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In combination with the upper and lower sections of a bee hive having formed therein a communicating passage, a cover plate adapted to open and close said passage, said plate having arranged therein an outlet funnel or trap whereby when said plate is shifted to close the passage in said section of the hive, the bees are permitted to leave the upper section through said funnel and are prevented thereby from reentering the same.

2. The combination with the upper and lower sections of a bee hive having formed therein a communicating passage for the ingress and egress of the bees from one section to the other, of a slidably mounted cover plate to open and close said passage, said plate having formed therein an opening, a wire netting funnel arranged over said opening whereby the bees are permitted to pass from the upper section to the lower section of the hive when the cover plate is closed but are prevented from reëntering said upper section, and means whereby said plate is shifted.

3. In a trap for the inlet and outlet passages of a bee hive, a slidably mounted plate adapted to be moved back and forth across said passages, operating rods connected to the opposite ends of said plate, handles arranged on the outer ends of said rods, a substantially conical-shaped wire netting funnel arranged in said plate to permit the bees to pass out but prevent the reëntering of the bees while the plate is in a closed position, and a baffle tongue arranged in said funnel.

In testimony whereof I have hereunto set my hand in presence of two subscribing witnesses.

JOSIAH NICHOLS.

Witnesses:
 JOHN T. DOAN,
 CLOYD J. BROTHERT.